United States Patent
Ferrari et al.

(10) Patent No.: US 9,216,925 B2
(45) Date of Patent: Dec. 22, 2015

(54) METHOD FOR PRODUCING AGGREGATES FROM CEMENT COMPOSITIONS

(75) Inventors: Giorgio Ferrari, Milan (IT); Francesco Surico, Milan (IT); Alberto Brocchi, Milan (IT); Emanuele Banfi, Milan (IT); Cristiano Maltese, Milan (IT); Marco Squinzi, Milan (IT)

(73) Assignee: Mapei S.P.A., Milan (IT)

( * ) Notice: Subject to any disclaimer, the term of this patent is extended or adjusted under 35 U.S.C. 154(b) by 189 days.

(21) Appl. No.: 13/996,070

(22) PCT Filed: Dec. 16, 2011

(86) PCT No.: PCT/EP2011/073070
§ 371 (c)(1),
(2), (4) Date: Jul. 16, 2013

(87) PCT Pub. No.: WO2012/084716
PCT Pub. Date: Jun. 28, 2012

(65) Prior Publication Data
US 2014/0296370 A1 Oct. 2, 2014

(30) Foreign Application Priority Data
Dec. 21, 2010 (EP) .................................... 10196236

(51) Int. Cl.
*C04B 18/02* (2006.01)

(52) U.S. Cl.
CPC ............... *C04B 18/021* (2013.01); *C04B 18/02* (2013.01); *Y02W 30/95* (2015.05)

(58) Field of Classification Search
CPC ...... C04B 18/021; C04B 18/02; C04B 18/16; C04B 12/04; C04B 2103/0051; Y02W 30/95
See application file for complete search history.

(56) References Cited

U.S. PATENT DOCUMENTS

2012/0061284 A1 * 3/2012 Pasquier et al. ............... 206/568

FOREIGN PATENT DOCUMENTS

| DE | 19533083 | 3/1997 |
| JP | 8333143 | 12/1996 |
| JP | 11061128 | 3/1999 |
| JP | 2001302301 | 10/2001 |
| JP | 2009126761 | 6/2009 |
| WO | 2008/003676 | 1/2008 |

OTHER PUBLICATIONS

Database, Thomson Scientific, London, GB, XP002642047, & JP 3 147832, 2009.
International Search Report of PCT/EP2011/073070 of May 2, 2012.
International Preliminary Report of PCT/EP2011/073070 of Jan. 14, 2013.

* cited by examiner

*Primary Examiner* — Kriellion Sanders
(74) *Attorney, Agent, or Firm* — Silvia Salvadori, P.C.; Silvia Salvadori (57) ABSTRACT

A method for producing aggregates from fresh cement compositions, included concrete and residual concrete is disclosed, comprising the addition of a) flash setting accelerators and b) super-absorbent polymers to fresh unset cement compositions and blending this mixture until granular materials are formed.

9 Claims, 1 Drawing Sheet

METHOD FOR PRODUCING AGGREGATES FROM CEMENT COMPOSITIONS

This application is a U.S. national stage of PCT/EP2011/073070 filed on Dec. 16, 2011, which claims priority to and the benefit of European Application No. 10196236.3, filed on Dec. 21, 2010, the contents of which are incorporated herein by reference in their entirety.

BRIEF DESCRIPTION OF THE INVENTION

The present invention relates to a method for producing aggregates from fresh concrete and other cement compositions. Particularly, the present invention finds a convenient application to unset residual concrete which exceeds the amount required for the completion of the work or and, more generally, concrete mixes which for any reason, is not placed and needs to be recycled. Furthermore, the present invention relates to the material obtained by this method and its use as aggregate for concrete and other valuable applications.

DESCRIPTION OF THE STATE OF THE ART

Nowadays, most of the concrete used at the construction site or the like is shipped by truck mixers from the concrete manufacturing plants in the form of ready-mix concrete. Most often, the unset residual concrete which has not been used at the construction site is returned by the same truck mixers to the concrete manufacturing plant.

The main reason for the residual concrete is that contractors normally order to the manufacturing plant a surplus of the concrete required for the completion of the job. In fact, construction companies normally prefer to buy superabundant amount of concrete rather than suffering the shortage during the casting operations, caused by errors of estimation or other unforeseen accidents. In the case of these drawbacks, the disadvantages of successive application steps and the necessity of ordering additional amount of concrete is a source of considerable loss of time and money.

The cumbersome operations and costs for dealing with the reclaimed concrete are a heavy burden on the concrete manufacturing plant that accepts the residual concrete from the construction site. In fact, when the unset remained concrete is returned back, most frequently it is disposed off as an industrial waste, with dissipation of resources and additional costs. In recent years, the disposal of wastes has become more expensive and more difficult by the restrictions of the law, which discourages the disposal in landfills and conversely strongly encourages the recycling of wastes. In fact, the European Directive 2008/98/CE states that the disposal in landfill must be considered the last option for the treatment of wastes and that the recycling of wastes from construction must be increased at least up to 70 percent by the year 2020.

For these reasons, there is a strong effort to avoid the disposal of remained concrete and many treatments for the effective recycling and reutilization of unset residual concrete in another form have been proposed.

Apart those treatments that use residual concrete for the production of concrete elements for breakwaters, counterweights or other blocks which, after hardening, are crushed and used as roadbed material, other methods and devices have been proposed.

DE 3906645 describes a washing apparatus for residual unset concrete composed of a mixer in which the residual concrete is washed with clean water. By the rotation of a spiral system inside the drum of the washing device, the gravel and the sand are washed, separated and extracted from the mixer and the dilute supernatant cement suspension is collected in a sedimentation tank. The sand and the gravel, purified from the cement particles, are then transferred to the storage area and can be reused as aggregates for the production of concrete. The dilute cement suspension in the sedimentation tank is allowed to settle and, after sedimentation of the cement particles in the form of sludge, the clarified water can be partially reused as mixing water for concrete and the cement sludge is periodically removed from the tank and disposed off as waste. This system allows the recycling of gravel and sand but has several disadvantages. In the first place, the production of waste is not avoided. In fact, the cement sludge, after sedimentation in the tank, must be periodically removed and disposed off. Secondly, large amount of water is required to wash the residual concrete, namely from 1.5 to 2 cubic meter of water for cubic meter of concrete, producing large volumes of contaminated water. Only a minor fraction of this water can be reused as mixing water for the production of new concrete, because of the presence of dissolved salts and suspended solids, which interfere with the hydration of cement and have detrimental effects on the development of mechanical strength of concrete. So, the excess of water which cannot be reused must be treated before being discharged, with additional costs and the burden of duty of the permission to discharge.

DE 19518469 describes a method of reusing residual concrete comprising (a) the addition, in the truck mixer containing the residual concrete from the jobsite, of a precisely calculated amount of a retarder of cement hydration based on a phosphonic acid derivatives before the setting and (b) adding new fresh concrete in the truck mixer at the end of the desired retardation period, so that the ratio of cement in the fresh and old concrete fractions is at least 2:1. This method allows to keep the residual concrete unset in the truck mixer overnight or during the weekend and to reuse it the next morning in combination with new concrete, thus preventing the disposal of remained concrete and the production of waste. Nevertheless, this procedure of reusing the residual concrete is quite complex. In fact, it is necessary to know exactly the composition of residual concrete, its amount, workability, temperature and the time elapsed from the mixing. Afterwards, water is added to the residual concrete in the mixing truck in order to obtain a slump value of about 200 mm, followed by the right amount of phosphonic acid derivative, calculated according to the numerous aforementioned variables and the expected time of reuse. Furthermore, at the time of reuse the proportion of the mixing of residual concrete with the new concrete must be carefully controlled in order to avoid unwanted excessive retardation in the mechanical strength development of the new concrete. For these reasons, this method is quite difficult to be implemented at the concrete manufacturing plant and it is not practical.

Japanese Patent JP 4099583 discloses a method in which the residual concrete is treated with additives which prevent the hardening of cement but permit the coagulation of residual concrete. The coagulated concrete is then dried and solidified with weak bonding forces and can be crushed by non-pressurizing crushing devices and the aggregates can be separated from the poorly hydrated cement powder and recycled. This system allows to recover the aggregate without generating large amount of wastewater, but has the disadvantage that the hardening inhibiting agent must be completely removed from recovered aggregates in order to avoid the retardation of cement hydration when the recycled aggregate are used for the production of new concrete. Furthermore, this method does not avoid the generation of waste because the powder fractions which are separated from the aggregates cannot be reused and must be disposed. Finally, the residual concrete must be left for about one week before it becomes dry and it is necessary to secure large areas for this long term and therefore this method is not practical from these point of view.

Japanese Utility Model 3147832 describes a material for the treatment of residual concrete which allows the recycling of remained concrete without requiring large space or long period of time. The material comprises a super-absorbing polymer in powder or granular form sealed in a casing formed of water-soluble paper. When this material is added to a mixer containing residual concrete, the casing of water-soluble paper dissolves or disperses and the super-absorbing polymer is brought into contact with the concrete. After few minutes of mixing, generally from 5 to 10 minutes, the super-absorbing polymer swells and absorbs part of the water of the residual concrete forming a gel which incorporates cement and the other fine particles. This network structure covers the aggregates and produces a granular material which can be discharged from the mixer. The period of time for the hardening of the granular material is short as compared to the time required for the coagulated concrete of the method described in Japanese Patent JP 4099583. Furthermore, this system does not produce wastes because the cement particles and the other fines are incorporated in the gel network which covers the aggregates. By this way, the whole residual concrete can be transformed in a granular material and conveniently recycled as roadbed filling material.

In comparison with the other methods described in the prior art, the method claimed in Japanese Utility Model 3147832 has the advantage to prevent the production of wastes, but it still suffers of limitations and drawbacks. In fact, when the super-absorbing polymer is added to the residual concrete, at the beginning it absorbs the free water and forms a gel network with cement and finer aggregates (sand, filler, etc) but with the time of mixing the absorbed water is released and the granular materials become more again wet and sticky and tend to re-agglomerate again. If mixing is continued for longer periods of time, it is no longer possible to obtain the granular material and the concrete mass inside the truck mixer can form large a stiff blocks, requiring efforts to be discharged and disposed off, with waste of time and additional costs.

This drawback can occur even more frequently when the residual concrete contains fine mineral additions, like in self-compacting concrete (SCC), a highly flowable, non-segregating concrete which is becoming more and more popular in recent years. The design of SCC includes high dosage of superplasticizers and large amount of finely divided powders, like calcium carbonate, microsilica or other fillers. In the presence of such supplementary materials, the network structure of the gel formed by the super-absorbent polymer is softer in comparison with the gel of normal concrete and the grains tend to stick each other much more easily, favouring the re-agglomeration of residual concrete.

Another limit of the method proposed by Japanese Utility Model 3147832 is that it is not effective for reclaimed concrete which contains a surplus of water, which is normally added to prevent the stiffening and coagulation during the route from the jobsite to the concrete mixing plant. In this case, an extra dosage of super-absorbing polymer is not feasible because the network structure of the gel becomes viscous and sticky and instead of forming stable granular materials, the concrete mixture can agglomerate.

Another drawback of Japanese Utility Model 3147832 is that the super-absorbing polymers absorb water by a physical mechanism. Such water is only partially consumed by the cement hydration, while the major amount remains in the gel network and evaporates when the granular materials set and harden, leaving a highly porous cement paste which covers the aggregates. Due to the high porosity of this cement paste, the hardened grains are characterized by high water absorption and do not comply with the technical standards for the use of aggregates in concrete. Consequently, the granular materials resulting from the process described in Japanese Utility Model 3147832 cannot be used as aggregates for the production of concrete but only as roadbed filling material, with obvious limitations in the amount that is possible to recycle in construction.

SUMMARY OF THE INVENTION

The object of the present invention relates to a new method for recycling the residual fresh concrete which transforms the unset residual concrete into granular materials, in short period of time and without production of wastes. Furthermore, the new method is not limited to residual concrete, but it is effective for any type of residual concrete and cement mixtures, independently on the composition on of the concrete and the water to cement ratio, thus overcoming all the disadvantages of the methods described in previous art. The new method is also effective with concrete mixes and cement compositions containing recycled aggregates, such as debris from crushed concrete, demolitions, and with concrete mixes made with lightweight aggregates and other artificial aggregates, such as porous glass, expanded clay and plastic materials. Another object of the present invention is the production of granular materials from residual concrete which, after curing, are characterized by superior mechanical and physical properties compared with those of the prior art and can be used as aggregates for concrete. A further object of the present invention is the production of granular materials from reclaimed concrete mixtures and other cement compositions which are characterized by new properties for other valuable applications in the field of street and garden furniture, lightweight concrete, decorative and other valuable applications.

The aggregates of the present invention can be easily produced directly in the truck mixers or in other mixing plants according to the method described hereinafter.

DETAILED DESCRIPTION OF THE INVENTION

The method of producing aggregates from fresh concrete and cement composition of the present invention comprises the addition of a) a flash setting accelerator and b) a super-absorbent polymer to the unset concrete and blending this mixture in the truck mixers or other mixing devices, optionally in the presence of other ingredients, until granular materials are formed.

It was surprisingly found that the addition of a flash setting accelerator and a super-absorbent polymer to fresh concrete in a truck mixer or other mixing device, synergistically transforms the fresh concrete in a granular material and eliminates all the disadvantages of the methods described in the prior art. Particularly, the production of granular materials from residual concrete is no longer influenced by the water to cement ratio or by the presence of fillers. Another surprising feature of the present invention is that the granular materials obtained by combining flash setting accelerators and super-absorbent polymers are characterized by superior characteristics in comparison with those produced according the prior art and can be reused as aggregates for concrete.

Furthermore, by adding other ingredients to the residual concrete mixture or other cement compositions, in addition to the flash setting accelerators and the super-absorbent polymers, it is possible to produce granular materials which are characterized by new properties which can find applications in many fields, like street and garden furniture, lightweight concrete, decorative and other valuable applications.

Flash setting accelerators include calcium aluminate hydrates forming compounds and sodium silicate. The term "calcium aluminate hydrates" includes the hydration products of calcium aluminate ($CaO.Al_2O_3$) itself and other hydrates, such as AFt and AFm phases, which are formed when calcium aluminate and other aluminium compounds are added to residual concrete. AFt phase represents substances with the general formula $[Ca_3(Al,Fe)(OH)_6.12H_2O]_2.X_3.nH_2O$, where X is a double charged anion or 2 single charged anions. The most representative compound of this phase is ettringite, of formula $Ca_6Al_2(SO_4)_3(OH)_{12}.26H_2O$. AFm phase represents a groups of compounds with empirical formula $[Ca_3(Al,Fe)(OH)_6].X.nH_2O$, where X is a single charged anion or a half double charged anion. Typical anions are hydroxyl, sulfate and carbonate.

Calcium aluminate reacts with water according to the following reactions:

$$CaO.Al_2O_3 + 10H_2O \rightarrow CaO.Al_2O_3.10H_2O$$

$$2CaO.Al_2O_3 + (8+x)H_2O \rightarrow 2CaO.Al_2O_3.8H_2O + Al_2O_3.xH_2O$$

When calcium aluminate is added to concrete mixtures, the hydration of calcium aluminate is strongly accelerated due to the presence of calcium hydroxide and *gypsum*. Particularly, in the presence of calcium sulphate, calcium aluminate instantaneously produces ettringite, according the following reaction:

$$3CaO.Al_2O_3 + 3CaSO_4 + 32H_2O \rightarrow 3CaO.Al_2O_3.3CaSO_4.32H_2O$$

In order to increase the amount of ettringite formed when calcium aluminate is added to the residual concrete, additional calcium sulphate can be supplied by external addition.

Other calcium aluminate hydrates forming compounds suitable for the present invention are hereinafter described. In one method, aluminium sulphate $Al_2SO_3.18H_2O$ reacts with calcium hydroxide $Ca(OH)_2$ and forms ettringite ($3CaO.Al_2O_3.3CaSO_4.30 \div 32H_2O$) according the following reaction:

$$6Ca(OH)_2 + Al_2(SO_4)_3.18H_2O + 6\text{-}8H_2O \rightarrow 3CaO.Al_2O_3.3CaSO_4.30 \div 32H_2O$$

$Ca(OH)_2$ is already present in the residual concrete mixture in sufficient amount to produce the calcium ions necessary for the production of ettringite; alternatively, they can be supplied by external addition in the form of calcium nitrate or other soluble salts, if required. In latter case, it is preferable that aluminium sulphate and soluble calcium salts can be blended before the addition.

According to another method, ettringite may be formed from calcium sulpho-aluminate $CaO.3Al_2O_3.SO_3.2H_2O$ and *gypsum* $CaSO_4.2H_2O$ through the following chemical equation:

$$4CaO.3Al_2O_3.SO_3.2H_2O + 2CaSO_4.2H_2O + 31H_2O \rightarrow 3CaO.Al_2O_3.3CaSO_4.32H_2O + 2Al_2O_3.3H_2O$$

Gypsum is already present in the residual concrete mixture, but it can be added with calcium sulpho-aluminate in premixed solid form.

In another embodiment, ettringite is formed by mixing calcium aluminate $CaO.Al_2O_3$ and anhydrite $CaSO_4$ according the following chemical equation:

$$3CaO.Al_2O_3 + 3CaSO_4 + 35H_2O \rightarrow 3CaO.Al_2O_3.3CaSO_4.32H_2O + 2Al(OH)_3$$

Also in this case, *gypsum* is already present in the residual concrete mixture, but it can be added with calcium sulpho-aluminate in preblended solid form.

Furthermore, in another embodiment sodium aluminate $NaAl(OH)_4$, calcium hydroxide $Ca(OH)_2$ and *gypsum* $CaSO_4$ react according to the following reaction:

$$2NaAl(OH)_4 + 3Ca(OH)_2 + 3CaSO_4 + 26H_2O \rightarrow 3CaO.Al_2O_3.3CaSO_4.32H_2O + 2NaOH$$

Still in another embodiment, alumina cement can be added to the residual concrete in order to form ettringite according the following reaction:

$$3CaO.Al_2O_3 + 3CaSO_4 + 32H_2O \rightarrow 3CaO.Al_2O_3.3CaSO_4.32H_2O$$

Also in this case, *gypsum* is already present in the residual concrete mixture, but it can be added to alumina cement in preblended solid form.

For the purpose of the present invention, any of the aforementioned calcium aluminate hydrates forming compounds can conveniently be used.

The formation of AFm phase is always concurrent and complementary with the formation of AFt phases. Examples of AFm compounds are Hemicarboaluminate $\{C_3A.Ca[(OH)(CO_3)_{0.5}].xH_2O\}$, Monocarboaluminate ($C_3A.CaCO_3.xH_2O$) and Monosulfoaluminate ($C_3A.CaSO_4.xH_2O$). Both AFt and AFm phases are formed in fresh concrete systems in the presence of the aforementioned aluminum compounds and the mutual proportions in which they form depends on the type of cement, the type and the amount of aluminum compounds, the water to cement ratio, the time of hydration and the curing conditions.

Super-absorbent polymers (SAPs) is the general term referring to polymers capable to retain large amount of water in comparison to their weight. When SAPs come in contact with water, the water molecules diffuse into the void space inside the polymer network, hydrating the polymer chains. According the polymer structure, the polymer can swell as a polymer gel or slowly dissolve. This step can be reversed by removing water and SAPs return to a collapsed solid state. The ability to absorb water is denoted by the swelling ratio which is the ratio of the weight of swollen SAPs to the dried SAPs. The swelling ratio is determined by the degree of branching and cross-linking, the chemical structure of the monomers that make up the SAPs network and external factors such as pH, ionic concentration of the solution and the temperature. Because of their ability to interact with water, these polymers are sometimes referred to as hydrogels. Examples of SAPs are summarized in Table 1.

TABLE 1

Example of SAPs characterized by the source and the nature of their side groups.

| Category | Polymers | Monomer |
| --- | --- | --- |
| Natural Polymers | Cellulose, Chitosan, Collagen | |
| Synthetic Polymers | | |

TABLE 1-continued

Example of SAPs characterized by the source and the nature of their side groups.

| Category | Polymers | Monomer |
|---|---|---|
| Neutral SAPs | Poly(hydroxyethylmethacrylate) (PHEMA) | Hydroxyethyl Methacrylate |
| Ionic SAPs | Poly(ethylene glycol) (PEG) | Ethylene Glycol |
| | Poly(ethylene oxide) (PEO) | Ethylene Oxide |
| | Polyacrylic acid (PAA) | Acrylic Acid |
| | Polymethacrylic acid (PMMA) | Methacrylic Acid |
| | Polyacrylamide (PAM) | Acrylamide |
| | Polylactic acid (PLA) | Lactic Acid |

SAPs that are prepared from ionic monomers absorbs well more water than those from neutral monomers because of the electrostatic repulsion among the polymer chains. The degree of cross-linking corresponds to the number of the chemical joints. The higher the degree of cross-linking, and the higher the degree of cross-linking means the shorter the distance between the two cross-links, resulting which results in the lower degree of swelling. The degree of swelling also depends on external factors such as pH and the temperature. SAPs made from acidic monomers such as acrylic acid or methacrylic acid can be deprotonated at pH above 7 to create negative charge along the polymer chains, and the electrostatic repulsion leads to higher degree of swelling in such basic environment. Super-absorbent polymers that are particularly suitable for the purposes of the present invention are ionic SAPs of Table 1 and, particularly those based on polyacrylamide modified with acrylic acid, with both linear and cross-linked structure.

When the aforementioned calcium aluminate hydrates forming compounds and the super-absorbent polymers are added to fresh concrete mixtures or other fresh cement compositions, calcium aluminate hydrates form instantaneously and precipitate from the solution, consuming many molecules of water which are chemically bound in the aluminate structure. This reaction causes the drying of the residual concrete and a sharp reduction of the workability, even in the presence of surplus of water. After the formation of calcium aluminate hydrates, super-absorbent polymers swell and absorb additional water molecules, forming a gel network structure which incorporates cement, the calcium aluminate hydrates crystals and the other fine components of the concrete, like sand and fillers. By the rotation of truck mixers or other mixing devices, a layer of this gel network structure covers the aggregates of the cement mixture and firmly adhere to their surface, forming a granular material consisting of aggregates covered by the gel network. These grains, due to the low residual water and the presence of the crystals of calcium aluminate hydrates, do not stick together and can be easily discharged and cured in bulk without agglomeration. The present invention combines the chemical consumption of water by the calcium aluminate hydrates and the physical absorption by the super-absorbent polymer. By this method, all the problems caused by surplus of water and by the presence of high amount of fines in the residual concrete and, more in general, in any fresh cement composition are eliminated.

The time of mixing depends on the type of concrete and the dosage of the additives. Typically, it ranges from 3 to 10 minutes, but longer times can be applied. Therefore, by the method of the present invention it is possible to add the calcium aluminate hydrates forming compounds and the super-absorbent polymers to the residual concrete into the truck mixers at the jobsite and to produce the granular materials during the route from the jobsite to the concrete mixing plant. By this way, when the truck mixers reach the concrete manufacturing plant, the granular materials have already been formed and can be directly discharged, with a considerable time-saving and increase of productivity.

Furthermore, by the addition of the calcium aluminate hydrates forming compounds, less evaporable water remains after the cement hydration and the porosity of the resulting granular material is substantially lower as compared with the case in which only SAPs are used. As a result, the water absorption is reduced and the mechanical properties of the granular materials are definitely improved. These improvements significantly increase the possibility to recycle the residual concrete as aggregates in the construction industry. Similar effects are thought to occur when sodium silicate is used as flash setting accelerator.

The flash setting accelerators and the super-absorbent polymers can be added to the concrete mixture separately or blended as a single product.

The dosage of flash setting accelerators useful for the present invention depends on the composition and characteristics of the concrete mixture and can be varied in the range from 0.3 to 50 kg/m$^3$, preferably from 0.6 to 20 kg/m$^3$, more preferably from 0.8 to 15 kg/m$^3$ of fresh concrete. It can be added both in solid or liquid form according the nature of the accelerator.

Also the dosage of the super-absorbent polymers is related to the characteristics of the residual fresh concrete and ranges from 0.05 to 10 kg/m$^3$, preferably from 0.1 to 5 kg/m$^3$, more preferably from 0.15 to 2 kg/m$^3$ of residual concrete.

When the flash setting accelerators and the super-absorbent polymers are both solid, they can be blended as a single additive and the proportion of the ingredients can be varied according to the range of dosage of the individual components.

Other ingredients, beside the flash setting accelerators and the super-absorbent polymers, can be added to the residual concrete and other cement compositions, in order to further improve the characteristics of the resulting granular materials or to impart to the resulting granular materials other desired properties. These ingredients include cement and concrete accelerating agents, activators of aluminate hydrates forming compounds, retarding agents, waterproofing and water repellant agents, efflorescence inhibitors, slags, natural pozzolanas, silica fume, fly ashes, pigments and coloring agents, plastic and rubber materials, clays, hollow porous glass beads, herbicides, pesticides and fertilizers.

Set and hardening accelerators include, for example, calcium and sodium nitrate, calcium and sodium chloride, triethanolamine, sodium thiocyanate and calcium silicate hydrate, but any other agent capable to accelerate the hydration of cement can be conveniently used for the present invention. Activators for the formation of AFt and AFm phases include inorganic and organic soluble calcium compounds, like, for example, calcium hydroxide, calcium nitrate, calcium acetate, calcium formate and calcium thiocyanate. Examples of retarders are sodium and calcium gluconate, sucrose and other carbohydrate and carbohydrate derivatives, citric acid and citrates. Waterproofing and water-repellant agents include organosilicon compounds such as silicones, silane and siloxanes, colloidal and nano-silica and calcium stearate, but any other substances having similar effects can be conveniently used. The above mentioned supplementary ingredients can be formulated with the calcium aluminate hydrates forming compounds and the super-absorbent polymers as a single product or can be added separately during the mixing of residual concrete.

Substances with high content of amorphous silica, such as silica-fume and other natural or synthetic pozzolanic materials can be used to improve the durability of the granular materials of the present invention and to prevent the formation of efflorescences caused by calcium hydroxide.

In order to impart new properties for other valuable applications in the field of street and garden furniture, pigments and other colouring substances can be added with the main ingredients. As an example, pigments based on iron, manganese, zinc, and chromium oxides can be used, in order to impart to the granular materials black, brown, red, yellow and green colours. Different colours and effects can be obtained with organic pigments, including fluorescent dyes. Both organic and inorganic pigments and dyes can be used in powder, paste, solution or dispersion form. The resulting coloured aggregates can be used, after curing, for garden and street furniture. By properly selecting the type and the particle size distribution of the aggregates in the concrete mixture and white cement, it is possible to produce granular materials with outstanding aesthetic value. These materials can be further polished and used as substitutes for hard natural stones in terrazzo floorings and other applications.

Besides the aforementioned components, many other substances can be used in order to impart specific properties to the granular materials of the present invention. For example, the addition of fertilizers to the main ingredients can represent a useful complementary element when the granular materials of the present invention are used as decorative elements for potters and flower-beds. By this way, besides the decorative effect due to the coloured granular material, the controlled release of the fertilizer ensures a prolonged and controlled dosage of nutrients to the soil. In other applications, the addition of herbicides and/or pesticides to the main ingredients can ensure the controlled release of substances able to preserve the plants from pests and dangerous insects.

Another application of the present invention is the production of lightweight aggregates by adding to the fresh concrete mixture or other cement compositions finely divided plastic or rubber materials. Once the plastic or rubber materials has been incorporated into the concrete or cement mixtures, the addition of the additives of the present invention produces granular materials which completely incorporate the plastic and rubber particles. These aggregates are characterized by lower density in comparison with natural aggregates and can be conveniently used for the production of lightweight concrete.

After the production, the granular materials of the present invention are discharged from the truck mixers or other mixing devices and can be stored in bulk in a limited size area and harden in short time. For example, if the granular materials are produced at the end of the working day, within the next 12-24 hours they achieve sufficient mechanical strength to be worked with mechanical digger and moved to the aggregates storage area or other destinations.

Even though the granular materials of the present invention are already characterized by good shape and particle size distribution when they are produced in the truck mixers or other mixing devices, it is possible to further improve their smoothness by a final treatment in a rotating plate, where the rolling of the grains in the plate imparts to the granular material of the present invention a spherical shape. The rotating plate may have different dimension, with variable inclination and speed of rotation. The time of residence of the granular materials in the rotating plate typically ranges from few seconds to some minutes.

The preparation of the granular materials of the present invention and the characteristics of the resulting products and their use are described in more details in the following examples.

Example 1

Self-compacting concrete (SCC) was prepared by mixing Portland cement (CEM I 52.5 R), microsilica (amorphous silica with average particle size distribution of 1 μm), an acrylic superplasticizer (Dynamon SX produced by Mapei), a retarding admixture (Mapetard produced by Mapei), aggregates (maximum diameter 20 mm) and water. The composition and the characteristic of the fresh concrete mixture are reported in the following table.

TABLE 2

Composition and characteristics of SCC (Self-Compacting-Concrete)

| | | | | Aggregate grading | | | | Slump (mm) | |
|---|---|---|---|---|---|---|---|---|---|
| Cement | Microsilica | Super-plasticizer | Retarding agent | 0-8 mm | 10-20 mm | Sand | W/C | After 7 min | After 30 min |
| 420 kg/m$^3$ | 40 kg/m$^3$ | 1.43% bwc$^a$ | 0.2% bwc$^a$ | 65% | 30% | 5% | 0.38 | 230 | 230 |

$^a$bwc = by weight of cement

Due to the presence of microsilica and superplasticizer, the fresh concrete had an excellent fluidity and, at the same time, was resistant to segregation. Furthermore, the addition of the retarding admixture maintained the workability of the fresh concrete for longer time and, after 30 minutes, the concrete had the same initial slump value of 230 mm.

This concrete has been used to evaluate the efficiency of the method of the present invention in comparison with that described in the Japanese Utility Model 3147832 and the results of the different tests are shown in Table 3. In the first test (Test 1) according the present invention, 48 grams of an calcium aluminate hydrates forming compound consisting of aluminium sulphate, corresponding to a dosage of 2.4 kg/m$^3$ of residual concrete, and 4 grams of a super-absorbent polymer consisting of an anionic polyacrylamide, corresponding to a dosage of 0.2 kg/m$^3$, were added to 20 liters of fresh concrete mixture having the composition and the characteristics of Table 2. After 5 minutes of mixing, the concrete was no longer homogeneous and appeared as a cluster of grains composed by the aggregates covered by the gel network of super-absorbing polymer, cement, microsilica, sand and calcium aluminate hydrates. The concrete mixture was then transferred to a rotating plate for about 1 minute where the rolling of the grains in the plate gave to the granular material of the present invention a spherical shape. This test confirmed that the combination of Aluminum Sulphate and anionic polyacrylamide produced a granular material starting from a concrete mixture, independently on the presence of fines and high dosage of retarding admixture.

The second test (Test 2) was carried out according to the method described in Japanese Utility Model 3147832 by adding to the composition of Table 2 (slump value of 230 mm after 30 minutes of mixing) 4 grams of a super-absorbent polymer consisting of an anionic polyacrylamide, corresponding to a dosage of 0.2 kg/m$^3$ of residual concrete. After 5 minutes of mixing, the concrete had a slump value of 150 mm. This concrete mixture was transferred to a rotating plate but no granular materials were formed even by rolling for additional 10 minutes.

In the third test (Test 3), the dosage of super-absorbent polymer of Test 2 was increased to 0.6 kg/m$^3$. After 5 minutes of mixing, the slump value of the concrete composition of Table 2 was reduced at 70 mm and the appearance of the concrete was stiff. This concrete composition was transferred to a rotating plate where, by the effect of the rotary motion, it was transformed in grains of large diameter. By further continuing the roll of the plate, these grains agglomerated into a single mass which was no longer possible separate. Tests 2 and 3 clearly indicated that in the case of concrete mixtures very rich in fines and containing retarding admixtures, it is not possible to obtain granular materials only by using super-absorbent polymers.

In the fourth test (Test 4), 72 grams of a calcium aluminate hydrates forming compound consisting of aluminium sulphate, corresponding to a dosage of 3.6 kg/m$^3$ of residual concrete, were added to the concrete composition of Table 2, without super-absorbent polymer. After 5 minutes of mixing, the cement mixture was dry but no granular material was formed in the mixer and the appearance of the resulting cement material was inhomogeneous. This test confirmed that both calcium aluminate hydrates forming compounds and super-absorbent polymers were necessary to obtain granular materials.

The results of these tests are summarized in Table 3.

TABLE 3

Results of the tests on Self-Compacting-Concrete

| | | Dosage kg/m$^3$ of concrete) | |
|---|---|---|---|
| Test | | Calcium aluminate hydrates forming compound | Super-absorbent polymer | Final product |
| 1 | Present invention | 2.4 | 0.2 | Granular material |
| 2 | Comparative | 0 | 0.2 | Concrete with reduced workability |
| 3 | Comparative | 0 | 0.6 | Single sticky mass |
| 4 | Comparative | 3.6 | 0 | Inhomogeneous material |

This example clearly indicates that the addition of calcium aluminate hydrates forming compounds to the super-absorbent polymers was necessary to obtain granular material from the concrete mixture of Table 2.

Example 2

This example simulates the conditions of restoring the fluidity of residual concrete when a surplus of water is added to the truck mixers to avoid the stiffening of the concrete during the route from the jobsite to the concrete mixing plant.

Concrete batches characterized by an initial slump values of 220±10 mm were prepared in a mixer by using CEM II/A-LL 42.5 Portland cement, acrylic superplasticizer (Dynamon SX produced by Mapei) and aggregates with a maximum diameter of 30 mm. After 90 minutes from the mixing, the slump value was measured again and water was added in order to restore a slump value of 240±10 mm, simulating the conditions of reclaimed concrete which is returned to the concrete mixing plant with a surplus of water. Calcium aluminate hydrates forming compound and super-absorbent polymer according to the present invention were added in Test 5, 6, 7 and 8, while only super-absorbent polymer was used in comparative Test 9, as shown in Table 4.

TABLE 4

Composition and characteristics of concrete used for the simulation reclaimed concrete with a surplus of water

| Composition/ Characteristics | Test 5 (Present invention) | Test 6 (Present invention) | Test 7 (Present invention) | Test 8 (Present invention) | Test 9 (Comparative) |
|---|---|---|---|---|---|
| Dosage of cement (kg/m$^3$) | 300 | 302 | 304 | 304 | 299 |
| Superplasticizer (% bwc$^a$) | 0.7 | 0.7 | 0.7 | 0.7 | 0.7 |
| W/C | 0.65 | 0.65 | 0.65 | 0.65 | 0.65 |
| Initial slump (3 min) | 220 | 215 | 220 | 220 | 220 |
| Slump after 90 min | 65 | 65 | 60 | 60 | 65 |
| Surplus of water added to restore the slump at 240 mm ± 10 (%) | 20 | 20 | 19 | 19 | 20 |
| Anionic Polyacrylamide (kg/m$^3$) | 0.2$^b$ | 0.2$^c$ | 0.2 | 0.2 | 0.2 |
| Aluminium sulphate (kg/m$^3$) | 2.7 | 2.7$^c$ | — | — | — |
| Sodium aluminate (kg/m$^3$) | — | — | 2.7 | — | — |
| High alumina cement - 85% calcium aluminate (kg/m$^3$) | — | — | — | 15 | — |
| Gypsum (kg/m$^3$) | — | — | — | 1.5 | — |
| Formation of granular material | yes | yes | yes | yes | no |

$^a$bwc = by weight of cement
$^b$Polyacrylamide was added 2 minutes after Aluminium sulphate
$^c$Aluminium sulphate and Polyacrylamide were added together as a single product After 5 minutes from the addition of aluminium sulphate and polyacrylamide, concrete Tests 5, 6, 7 and 8 were transformed in granular materials directly in the mixer, producing a cluster of smooth granules of small dimensions. These results clearly indicate that the method of the present invention is effective also in the case of residual concrete characterized by a surplus of water. On the other hand, the comparative concrete Test 9, containing only anionic polyacrylamide, could not be transformed in granular material. This concrete was transferred to the rotating plate, where it was granulated giving rise to granules characterized by a wet aspect. By continuing the roll of the plate for more than 20 minutes, the granular material agglomerated in larger grains and, finally, in a plastic mass. This example indicates that the addition of calcium aluminate hydrates forming compounds to the super-absorbent polymers was necessary to obtain granular material from a residual concrete containing a surplus of water.

Example 3

This example aims to demonstrate that the characteristics of cement materials produced according to the method of the present invention, by using both the calcium aluminate hydrates forming compounds and the super-absorbent polymers, are substantially different from those obtained by the method described in Japanese Utility Model 3147832, where only super-absorbent polymers are used.

Concrete batches characterized by an initial slump values of 220±10 mm were prepared in a mixer by using CEM II/A-LL 42.5 Portland cement (dosage of 300 kg/m³), acrylic superplasticizer (Dynamon SX produced by Mapei) and aggregates with a maximum diameter of 30 mm.

After 30 minutes from mixing, the slump value of the abovementioned concrete mixture was about 80 mm and calcium aluminate hydrates forming compound and super-absorbent polymer according to the present invention were added in Test 10, while only super-absorbent polymer was used in comparative Test 11, as shown in the next Table 5.

TABLE 5

Composition and characteristics of concrete used in Example 3

| Composition/Characteristics | Test 10 (Present invention) | Test 11 (Comparative) |
|---|---|---|
| Dosage of cement (kg/m³) | 300 | 299 |
| Superplasticizer (% bwc$^a$) | 0.7 | 0.7 |
| W/C | 0.60 | 0.60 |
| Initial slump (3 min) | 215 | 215 |
| Slump after 30 minutes | 85 | 80 |
| Anionic Polyacrylamide (kg/m³) | 0.2$^b$ | 0.2 |
| Aluminium sulphate (kg/m³) | 4.0 | — |
| Slump after 5 minutes from the addition of granulating agents | 0 | 0 |

$^a$bwc = by weight of cement
$^b$Polyacrylamide was added with Aluminium sulphate Even though both the residual concrete of Test 10 according to the present invention and that of comparative Test 11 can be transformed in granular materials by mixing in the rotating plate, their characteristics were completely different, as demonstrated by the Vebé consistency test. According to EN 12350-3 standard method, this test method provides a measure of the consistency of stiff concrete having no measurable slump. In these cases, the consistency is expressed as the time, in seconds, required for a given mass of fresh concrete to be consolidated by external vibration in a cylindrical mold. The results of Vebé test of Tests 10 and 11 are reported in the following Table 6.

TABLE 6

Results of Vebé tests on residual concrete treated according to the method of the present invention (Test 10) and only with super-absorbent polymer (comparative Test 11)

| | Vebé test (seconds) | |
|---|---|---|
| Sample test | After 5 minutes of mixing | After 20 minutes of mixing |
| Granular material of Test 10 (Present invention) | Not measurable | Not measurable |
| Granular material of Test 11 (Comparative) | 7 | 9 |

The results of Table 6 clearly indicate that the behavior according the Vebé test of granular materials of Test 10 and Test 11 was completely different. In fact, while the granular material of comparative Test 11, under the effect of the external vibration, compacted itself and completely filled the cylindrical mold in few seconds, as a typical stiff concrete, the granular material of Test 10, immediately after starting the external vibration, collapsed as an incoherent material. This result indicates that the presence of both calcium aluminate hydrates forming compounds and super-absorbent polymers according to the present invention produces granular materials which are much more dry and substantially different from those obtained by using only the super-absorbent polymers.

The concrete mixtures of comparative Test 11 and Test 10 were transformed in granular materials with the aid of a rotating plate and cured for 28 days in standard conditions (23° C. and 95% r.h.). After curing, the fraction between 10 to 20 mm of each test was separately collected and water absorption was measured according to UNI-EN 1097-6:2002 Method on each fraction. The results of the following Table 7 indicate that the granular materials of Test 10 produced according to the present invention is characterized by a much lower water absorption in comparison with the granular material of comparative Test 11 and can therefore be used as aggregate in concrete.

TABLE 7

Results of water absorption tests on granular materials of the present invention (Test 10) and only with super-absorbent polymer (comparative Test 11)

| Sample test | Water absorption (%) |
|---|---|
| Granular material of Test 10 (Present invention) | 1.8 |
| Granular material of Test 11 (Comparative) | 4.7 |

Example 4

In this example the granular materials produced according to the method of Test 10, after curing for 28 days in standard conditions (23° C. and 95% r.h.), were tested as substitutes of natural aggregates for producing new concrete. Two concrete mixtures, characterized by the same dosage of cement, water to cement ratio and similar grading of aggregates, were produced. The first concrete (Test 12) was produced using a fraction of the granular material of Test 10 as a partial substitute of natural aggregates, while the second concrete (comparative Test 13) was prepared using only natural aggregates. For the production of the concrete of Test 12 it was not possible to utilize the whole granular materials of Test 10 because the production process of the present invention increases the grading of the original aggregates of the residual concrete. In fact, due to the covering of the aggregates by the gel network of super-absorbing polymer, cement, sand and finer aggregates, the resulting granular materials was lacking of the fine fractions of the original aggregates and had an excess of larger fractions. The composition of the different concrete batches is reported in the following Table 8.

TABLE 8

Composition of concrete made with recycled aggregates from Test 10 of the present invention and a reference concrete made with natural aggregates with the same grading

| Composition/Characteristic | Test 12 | Test 13 |
|---|---|---|
| Dosage of cement (kg/m3) | 300 | 302 |
| Dosage of superplasticizer (% bwc$^a$) | 0.50 | 0.50 |
| W/C | 0.57 | 0.60 |
| AGGREGATES | | |

TABLE 8-continued

Composition of concrete made with recycled aggregates from Test 10 of the present invention and a reference concrete made with natural aggregates with the same grading

| Composition/Characteristic | Test 12 | Test 13 |
|---|---|---|
| Test 10 aggregates (20-30 mm) (%) | 20 | — |
| Test 10 aggregates (10-20 mm) (%) | 12 | — |
| Test 10 aggregates (0-10 mm) (%) | 12 | — |
| Natural aggregates (20-30 mm) (%) | — | 23 |
| Natural aggregates (10-20 mm) (%) | — | 15 |
| Natural aggregates (0-8 mm) (%) | 50 | 56 |
| Filler calcium carbonate 0000 (%) | 6 | 6 |

[a]bwc = by weight of cement

The results of concrete tests are reported in the following Table 9 and indicate that the granular materials of the present invention can be used as substitutes of natural aggregates for the production of concrete. In fact, the performances of the concrete prepared with the recycled aggregates of Test 10 were even better than those of the concrete prepared with natural aggregates with similar grading.

TABLE 9

Results of concrete test made with recycled aggregates from Test 10 of the present invention and a reference concrete made with natural aggregates with the same grading

| Test number | W/C | Slump (mm) | | | Air content (%) | Specific gravity ($kg/m^3$) | Mechanical strength (MPa) 20° C. 95% r.h. | | |
|---|---|---|---|---|---|---|---|---|---|
| | | 7 min | 30 min | 60 min | | | 3 days | 7 days | 28 days |
| Test 12 | 0.57 | 200 | 170 | 70 | 1.5 | 2322 | 26.4 | 30.7 | 42.6 |
| Test 13 | 0.60 | 200 | 130 | 80 | 1.5 | 2368 | 24.3 | 32.5 | 40.2 |

Surprisingly, the concrete with the aggregates of Test 10 produced according the present invention required less mixing water than the concrete produced with natural aggregates and maintained the fluidity of the fresh mixture for longer time. As a consequence of the reduced water to cement ratio W/C, concrete produced with the aggregates of the present invention had definitely higher mechanical strength.

Example 5

Concrete batches characterized by an initial slump values of 220±10 mm were prepared in a mixer by using CEM II/A-LL 42.5 Portland cement, acrylic superplasticizer (Dynamon SX produced by Mapei) and aggregates with a maximum diameter of 30 mm. A mixture of calcium aluminate hydrates forming compound, super-absorbent polymer according to the present invention and red pigment Bayferrox 110C in powder form were added as shown in the next Table 10.

TABLE 10

Composition and characteristics of concrete of Example 5

| Composition/Characteristics | Test 14 (Present invention) |
|---|---|
| Dosage of cement ($kg/m^3$) | 300 |
| Superplasticizer (% bwc[a]) | 0.7 |
| W/C | 0.60 |
| Initial slump (3 min) | 215 |
| Anionic Polyacrylamide ($kg/m^3$) | 0.2[b] |
| Aluminium sulphate ($kg/m^3$) | 4.0 |
| Bayferrox 110C ($kg/m^3$) | 10.0 |

[a]bwc = by weight of cement
[b]Polyacrylamide was added with Aluminium sulphate After 5 minutes of mixing, a red granular material was produced which, after curing, can be used as street and garden furniture.

Example 6

This example describes the production of lightweight aggregates with the method of the present invention.

Figure 1:
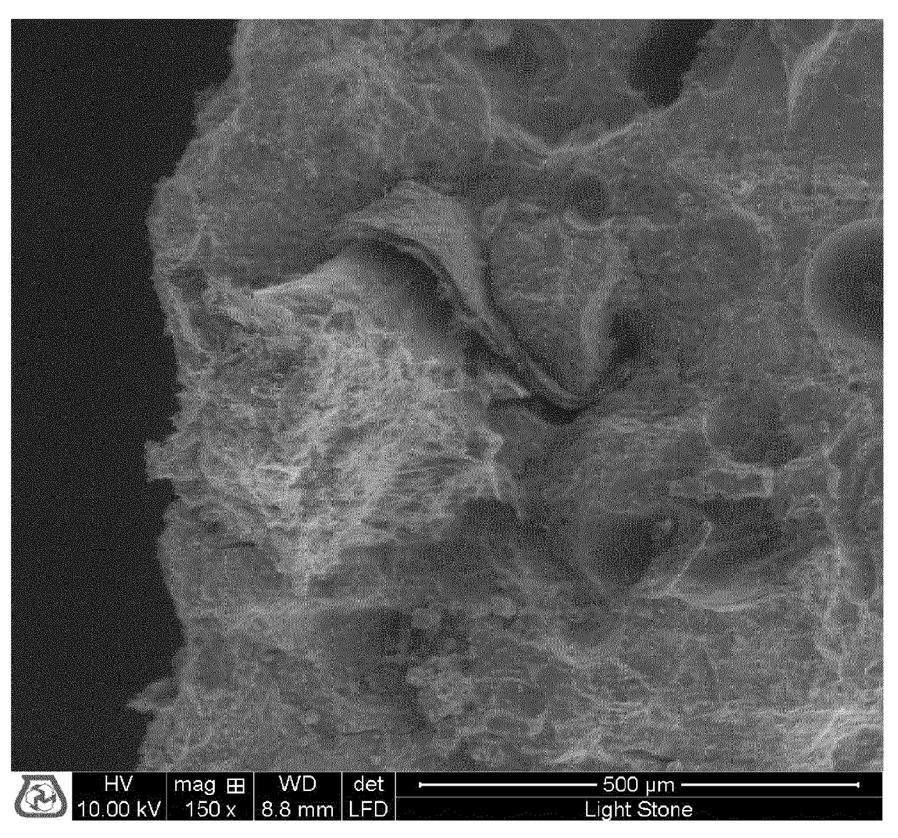
FIG. 1 is an electron microscope image of the aggregate prepared according to the present invention.

6 kg of CEMI 52.5R Portland cement, 18 kg of natural sand having a maximum diameter of 4 mm and 2.5 kg of recycled plastic in the form of fibers with an average length of 0.3 cm were thoroughly mixed in a laboratory mixer. 2.76 kg of water and 60 grams of Dynamon SP3 superplasticizer produced by Mapei were added and the resulting cement composition was mixed for 5 minutes. Subsequently, 10.5 grams of super-absorbent polymer based on anionic polyacrylamide and 240 grams of Aluminium Sulphate, both in powder form, were added. After further 5 minutes of mixing, the composite cement composition was transformed into granular materials and all the plastic fibers were included and bonded inside the grains, as shown in the electron microscope images of FIGURE. The density of the hardened granular materials, measured after 7 days of curing at 23° C. and 95% r.h., was 1.960 $kg/m^3$, confirming that these materials can be used for the production of lightweight aggregates.

Example 7

This example describes the application of the method of the present invention to a fresh residual concrete mixture directly on the truck mixer.

2 cubic meters of residual concrete characterized by a cement dosage of 330 $kg/m^3$ of cement (CEMI 42.5 A-LL), W/C=0.48 and a slump value of 210 mm were charged in the drum of a truck mixer. 1 kg (0.5 $kg/m^3$ of residual concrete) of powder anionic polyacrylamide and 12 kg of Aluminium Sulphate (6 $kg/m^3$ of residual concrete) were added to the residual concrete through the top opening of the drum. After 7 minutes of mixing, the sense of rotation of the drum was inverted and the granular material formed from the residual concrete according the method of the present invention was discharged and let harden in bulk.

After discharging the granular material formed according the present invention, it was surprisingly found that the interior of the drum of the truck mixer was exceptionally clean.

This example demonstrates that by the method of the present invention, it is possible not only to prevent the production of solid wastes, by transforming the residual concrete in granular materials which can be reused as aggregates for the production of concrete, but also to reduce the production of wastewater at the mixing plant and the water consumption.

The invention claimed is:

1. Method for producing aggregates from fresh cement compositions, included concrete and residual concrete, said method comprising
adding a) flash setting accelerators and b) super-absorbent polymers to fresh unset cement compositions and
blending this mixture until granular materials are formed.

2. Method according to claim 1 wherein flash setting accelerators are selected from sodium silicate or substances forming calcium aluminate hydrates.

3. Method according to claim 2, wherein the substances forming calcium aluminate hydrates are independently selected from calcium aluminate, aluminum sulphate, sodium aluminate, alumina cement or mixtures thereof.

4. Method according to claim 1, wherein the flash setting accelerator is in the range from 0.3 to 50 kg/m$^3$ of concrete.

5. Method according to claim 1, wherein the super-absorbent polymer is in the range from 0.05 to 10 kg/m$^3$ of concrete.

6. Method according to claim 1, wherein the flash setting accelerators and the super-absorbent polymers are added separately or blended as a single product.

7. Method according to claim 1 further comprising supplementary ingredients added, separately or in combination, including cement and concrete accelerating agents, activating agents for the formation of aluminate hydrates, retarding agents, waterproofing and water repellant agents, efflorescence inhibitors, slags, natural pozzolanas, silica fume, fly ashes, silica sand, calcium carbonate, pigments and coloring agents, clays, porous hollow glass, herbicides, pesticides, fertilizers, plastic and rubber materials.

8. Method according to claim 1 where the granular material is further treated in a rotating plate.

9. Granular materials produced by the method of claim 1.

* * * * *